United States Patent [19]
Arsenault

[11] Patent Number: 5,227,463
[45] Date of Patent: Jul. 13, 1993

[54] PROCESS FOR THE MANUFACTURE OF FUNCTIONALIZED RESINS FROM STYRENE, DIVINYL BENZENE AND ALKANE DITHIOL

[75] Inventor: Gilles J. Arsenault, Courtright, Canada

[73] Assignee: Polysar Rubber Corporation, Sarnia, Canada

[21] Appl. No.: 897,737

[22] Filed: Jun. 12, 1992

[51] Int. Cl.$^5$ .................... C08G 75/00; C08G 75/14
[52] U.S. Cl. ................................ 528/376; 528/392
[58] Field of Search ........................... 528/376, 392

[56] References Cited

U.S. PATENT DOCUMENTS 3,586,644 6/1971 Geert Jan de Jong .
3,944,507 3/1976 Clemens et al. .
4,098,727 7/1978 Haag et al. ............................ 521/53
4,950,408 8/1990 Duisters et al. ..................... 210/660

OTHER PUBLICATIONS

Chemical Abstracts, vol. 82-44440r (1975).
Chemical Abstracts, vol. 85-5888k (1976).

Primary Examiner—Harold D. Anderson
Attorney, Agent, or Firm—Jospeh C. Gil; Godfried R. Akorli

[57] ABSTRACT

A process is provided for the production of functional group containing resins wherein an alkyl-dithiol is added to the polymerizing mixture of styrene and divinyl benzene part way through the polymerization. On completion of the polymerization, the product is a thiol functionalized styrene-divinyl benzene resin.

8 Claims, No Drawings

PROCESS FOR THE MANUFACTURE OF FUNCTIONALIZED RESINS FROM STYRENE, DIVINYL BENZENE AND ALKANE DITHIOL

FIELD OF THE INVENTION

This invention is directed to a simplified process for the preparation of a functional group containing resin, more particularly to a process for the incorporation of thiol groups onto styrene-divinyl benzene resins.

DESCRIPTION OF THE PRIOR ART

It is well known in the art that styrene-divinyl benzene resins can be chemically modified, usually but not necessarily by means of the unpolymerized vinyl groups, by reaction with various materials in order to introduce a functional group into the resin. Such functional group containing resins may be used as ion exchange resins or as ion chelating resins. The preparation or use of such functionalized resins is described in U.S. Pat. Nos. 3 586 644, 3 944 507, 4 098 727 and 4 950 408 and in Chemical Abstracts, Volume 82 44440r and Volume 85 5888k. Such resins are generally prepared by suspension polymerization of the styrene-divinyl benzene mixture, recovery of the resin and then functionalization by free radical reaction of residual pendent vinyl groups with, for example, a dithiol compound.

SUMMARY OF THE INVENTION

I have now discovered that I can make functional group containing resins by an essentially one step process thereby simplifying the manufacturing process.

In accordance with my invention, there is provided a process for the production of functional group containing resins wherein styrene and divinyl benzene in weight ratio of from about 1 to 3 to about 1 to 0.1, preferably from about 1 to 2 to about 1 to 0.2, are suspension polymerized by free radical initiators at a temperature of from about 60° C. to about 90° C., the improvement being that at no less than 15 per cent and no more than 80 per cent, preferably from about 15 to about 50, of the total polymerization time an alkyl-dithiol is introduced into the polymerizing mixture, said alkyl-di-thiol having a $C_2$ to $C_6$ alkyl group and being added in an amount of from about 5 to about 20 weight per cent based on the total of styrene plus divinyl benzene, and the polymerization continued to yield a thiol functionalized styrene-divinyl benzene resin.

DESCRIPTION OF THE PREFERRED EMBODIMENTS

The suspension polymerization of styrene and divinyl benzene is fairly well known. A general description is provided in Die Angewandte Makromolekulare Chemie 1988, Vol. 164, pages 45-58. The two monomers are added to water containing a suitable dispersing agent, an organic diluent mixture which is usually a mixture of a solvent and a non-solvent may be added, the mixture is stirred well, the organic free radical source, usually an organic peroxide, is added and the mixture stirred until the organic phase is dispersed as small droplets in the aqueous phase. Usually inert gas is added to blanket the vapour space in the reactor which is then heated to the polymerization temperature. The polymerization temperature is usually from about 60° C. to about 90° C., preferably from about 75° to about 85° C. and the polymerization is usually from about 10 to about 28, preferably from about 16 to about 24, hours. On completion of the polymerization, the mixture is usually cooled, filtered to separate off the beads of polymer and the polymer washed with water and then with alcohol and frequently extracted with methanol. The polymer is then dried, usually first in an air drying oven and finally in a vacuum oven. The beads of polymer are then ready for chemical modification. Such chemical modification can be by direct reaction with the modifier or can be undertaken after the beads have been swollen with an organic solvent. For example, the polymer may be chloromethylated and then reacted with other agents, e.g. amines or thiourea, and may be further reacted with other agents to produce the functionalized groups. The polymer may be reacted with phosphorus trichloride and then reacted with other agents. The polymer may be reacted with sulphur halides followed by either oxidation to produce sulphonic acid groups or by reduction to produce thiol groups.

In the process of my invention, an alkyl-di-thiol is added to the polymerizing mixture part way through the polymerization process. Styrene and divinyl benzene, in weight ratio of from about 1 to 3 to about 1 to 0.1 are added to a water solution of a dispersing system. Typically, the amount of water will be from about 5 to about 10 times the total weight of styrene and divinyl benzene. Preferably the weight ratio of styrene to divinyl benzene is from about 1 to 2 to about 1 to 0.2. A typical dispersing system contains polyvinyl alcohol and my contain a solvent - non-solvent mixture (for example and without limitation, toluene and 2-ethyl-1-hexanol in a weight ratio of 3 to 4) to control the particle size and porosity of the polymer beads. Divinyl benzene usually contains from about 40 to about 60 or more per cent by weight of divinyl benzene, the balance being ethyl styrene and other impurities. It is used as received. Suitable free radical initiators include benzoyl peroxide and the like which is added last. The aqueous dispersion of the organic materials is stirred until the organic phase is dispersed as small droplets in the aqueous phase, the vapour space is blanketed with nitrogen and the temperature of the reactor is rapidly raised to a constant temperature of from about 60° to about 90° C., preferably from about 75° to about 85° C. and polymerization starts. The polymerization reaction usually takes from about 10 to about 28, preferably from about 16 to about 24, hours, the latter stages of the polymerization actually being further crosslinking of the polymer. At the point when no less than 15 and no more than 80 per cent of the total polymerization time has elapsed, a portion of an alkane-di-thiol is added to the polymerizing mixture. Preferably the alkane-dithiol is added when no less than 15 to about 50 per cent of the polymerization time has elapsed. Suitable alkane-di-thiols are the $C_2$ to $C_6$ alkane dithiols such as 1,2-ethanedithiol, 1,3-propanedithiol, 1,4-butanedithiol, etc. The quantity of alkane-di-thiol added is from about 5 to about 20 weight per cent, preferably from about 7 to about 12 weight per cent, based on the total of styrene plus divinyl benzene. The polymerization is allowed to continue (additional free radical initiator can be added, if desired, at this stage). On completion, the polymer is washed, extracted and dried as herein before described.

It is believed that the alkane-di-thiol reacts with the pendant vinyl groups and becomes bound to the polymer through one sulphur atom and has a thiol group left unreacted. Typically, the polymer, in macroporous form, contains from about 0.5 to about 10 weight per cent of sulphur of which approximately one half is believed to be present as thiol groups. Such a polymer may be further modified by reaction with the thiol groups.

Such a thiol containing resin may be used to react with various inorganic compounds present in either organic or inorganic systems and has been found to be useful to remove rhodium from an organic polymer solution.

The following examples illustrate the scope of the invention and are not intended to limit the same.

EXAMPLE 1

An aqueous suspension system was prepared by adding 0.3 g of polyvinyl alcohol and 1.1 g of sodium chloride to 202 g of water. To this was then added a solvent-nonsolvent mixture which is 18.5 g of toluene and 23.7 g of 2-ethyl-1-hexanol. The monomers were then added, being 12.4 g of styrene and 13.3 g of divinyl benzene (which contained about 55 weight % of divinyl benzene and about 35 weight % of ethylstyrene). Finally, 0.25 g of benzoyl peroxide was added. The mixture was stirred rapidly until the organic phase had formed small droplets throughout the aqueous phase, stirring was continued, the vapour phase was displaced with nitrogen and the reaction vessel was rapidly heated to and maintained at 80° C. At 4 hours and 10 minutes, 2 g of 1,3-propanethiol was added and the reaction continued for a total time of 23 hours. The mixture was cooled, the so-formed resin beads were separated by filtering, washed with ethanol and then extracted with methanol for 44 hours in a soxhlet extractor. The beads were dried in a vacuum oven. The resin was found to be a macroporous resin with the beads being slightly less than 0.2 mm diameter and containing 1.47 weight per cent of sulphur which is about 0.2 milli-equivalents of dithiol per gram of resin.

EXAMPLE 2

The quantities of materials as described in Example 1 were used. The mixture was stirred rapidly so that the organic phase had formed small droplets throughout the aqueous phase, stirring was continued and the reaction vessel was rapidly heated to and maintained at 80° C. At 6 hours and 20 minutes, 2 g of 1,3-propanethiol was added and the reaction was continued. At 7 hours and 15 minutes, 0.2 g of benzoyl peroxide were added and the reaction was continued for a total time of 23 hours. The resin was recovered as described in Example 1 and was found to be a macroporous resin with the beads being from 0.2 to 0.3 mm diameter and containing 0.55 weight per cent of sulphur which is about 0.17 milli-equivalents of dithiol per gram of resin.

What is claimed is:

1. A process for the production of functional group containing resins wherein styrene and divinyl benzene in weight ration of from about 1 to 3 to about 1 to 0.1 are suspension polymerized by free radical initiators at a temperature of from about 60° C. to about 90° C., the improvement being that at no less than 15 per cent and no more than 80 per cent of the total polymerization time an alkane-di-thiol is introduced into the polymerizing mixture, said alkane-di-thiol having $C_2$ to $C_6$ alkane group and being added in an amount of from about 5 to about 20 weight per cent based on the total of styrene plus divinyl benzene, and the polymerization continued to yield a thiol functionalized styrene-divinyl benzene resin.

2. The process of claim 1 in which additional free radical initiator is added after said alkane-di-thiol is added.

3. The process of claim 1 wherein said alkane-di-thiol is selected from 1,2-ethanedithiol, 1,3-propanedithiol or 1,4-butanedithiol.

4. The process of claim 3 wherein the polymerization temperature is from about 75° to about 85° C.

5. The process of claim 1 wherein the polymerization time is from about 10 to about 28 hours.

6. The process of claim 5 wherein the polymerization time is from about 16 to about 24 hours.

7. The process of claim 3 wherein the amount of alkane-di-thiol is from about 7 to about 12 weight per cent based on the total of styrene plus divinyl benzene.

8. The process of claim 7 wherein the polymerization temperature is from about 75° to about 85° C., the polymerization time is from about 16 to about 24 hours, the weight ratio of styrene to divinyl benzene is from about 1 to 2 to about 1 to 0.2 and the alkane-di-thiol is added at from about 15 to about 50 per cent of the total polymerization time.

* * * * *